US012589499B2

(12) United States Patent (10) Patent No.: US 12,589,499 B2

Halvorsen et al. (45) Date of Patent: Mar. 31, 2026

(54) MOBILE CONSTRUCTION ROBOT

(71) Applicant: Hilti Aktiengesellschaft, Schaan (LI)

(72) Inventors: Håvard Halvorsen, Sogndal (NO); Jørn Sandvik Nilsson, Sogndal (NO)

(73) Assignee: Hilti Aktiengesellschaft, Schaan (LI)

( * ) Notice: Subject to any disclaimer, the term of this patent is extended or adjusted under 35 U.S.C. 154(b) by 204 days.

(21) Appl. No.: 18/306,293

(22) Filed: Apr. 25, 2023

(65) Prior Publication Data

US 2023/0256611 A1 Aug. 17, 2023

Related U.S. Application Data

(63) Continuation of application No. 17/269,241, filed as application No. PCT/EP2019/071734 on Aug. 13, 2019, now Pat. No. 11,919,176.

(30) Foreign Application Priority Data

Aug. 22, 2018 (EP) .................................... 18190211

(51) Int. Cl.
    B25J 9/16 (2006.01)
    B25J 11/00 (2006.01)
    (Continued)
(52) U.S. Cl.
    CPC ............. B25J 9/1692 (2013.01); B25J 9/162 (2013.01); B25J 11/005 (2013.01); B25J 13/089 (2013.01);
    (Continued)
(58) Field of Classification Search
    CPC ........ B25J 9/1692; B25J 9/162; B25J 11/005; B25J 13/089; G05B 19/401;
    (Continued)

(56) References Cited

U.S. PATENT DOCUMENTS

| | | | | |
|---|---|---|---|---|
| 9,757,859 B1* | 9/2017 | Kolb | ........................ | B25J 5/007 |
| 2012/0298640 A1* | 11/2012 | Conrardy | ............... | G09B 25/02 |
| | | | | 219/130.01 |

(Continued)

FOREIGN PATENT DOCUMENTS

| | | |
|---|---|---|
| CN | 107543495 A | 1/2018 |
| EP | 2 407 282 A2 | 1/2012 |
| WO | WO 2016/066615 A2 | 5/2016 |

OTHER PUBLICATIONS

PCT/EP2019/071734, International Search Report dated Nov. 15, 2019 (Two (2) pages).

*Primary Examiner* — Dylan M Katz

(74) *Attorney, Agent, or Firm* — Crowell & Moring LLP

(57) ABSTRACT

A smart drilling system that includes a controller, a drilling machine with an optical marker, and a tracker station at a fixed spot of a construction site. The drilling machine includes an optical marker. The tracker station acquires the location of the drilling machine and its drill through tracking the optical marker. The drilling machine is moved into positions of multiple different work regions. The tracker station sequentially acquires the location of the multiple different work regions and transmits the acquired location information to the controller, such that, by using the transmitted locations, the controller converts drilling machine coordinates into desired perforation coordinates and recognizes an orientation of the drilling machine. The controller also recognizes a perforable point at a current position of the drilling machine through the location information of the drilling machine.

14 Claims, 2 Drawing Sheets

(51) Int. Cl.
    *B25J 13/08*       (2006.01)
    *G05B 19/401*    (2006.01)

(52) U.S. Cl.
    CPC .. *G05B 19/401* (2013.01); *G05B 2219/39017*
        (2013.01); *G05B 2219/39024* (2013.01); *G05B*
           *2219/39033* (2013.01); *G05B 2219/39047*
                             (2013.01)

(58) Field of Classification Search
    CPC ........... G05B 2219/39017; G05B 2219/39024;
                G05B 2219/39033; G05B 2219/39047;
                G05B 19/404; B25F 5/00; B25H 1/0035
    See application file for complete search history.

(56)                      References Cited

U.S. PATENT DOCUMENTS

| | | |
|---|---|---|
| 2013/0006421 A1 | 1/2013 | Brogardh |
| 2018/0283019 A1* | 10/2018 | Telleria ................... B24B 55/06 |
| 2018/0326507 A1* | 11/2018 | Halvorsen .............. B23B 39/08 |
| 2019/0224846 A1 | 7/2019 | Pivac |
| 2020/0346350 A1 | 11/2020 | Keselman et al. |

* cited by examiner

MOBILE CONSTRUCTION ROBOT

CROSS REFERENCE TO RELATED APPLICATIONS

This application is a continuation of U.S. application Ser. No. 17/269,241, filed Feb. 17, 2021, which is a continuation of PCT International Application No. PCT/EP2019/071734, filed Aug. 13, 2019, and European Patent Document No. 18190211.5, filed Aug. 22, 2018, the disclosures of which are expressly incorporated by reference herein.

BACKGROUND AND SUMMARY OF THE INVENTION

The present invention relates to a mobile construction robot for machining or finishing an architectural construction site, as well as to a method of operating using the mobile construction robot.

A mobile construction robot is known form WO 2016/066615. The robot is designed for drilling holes in ceilings and walls. A drilling machine is mounted to a robotic arm. The robotic arm stands on a vertical lift and a driving platform. A user can drive the robot by means of the driving platform to an area where holes are to be drilled. The robot may access and retrieve BIM files to allow it to determine where to the position the drilling machine by means of the robotic arm.

The robot can calculate its position and orientation based on inputs from a laser total station. The total laser station may be provided in the vicinity of the robot on the construction site floor. The robot has a reflector prism on each side. An advantage of this method is that an accuracy within the limits of the total station can be achieved. However, the total station needs to measure the position of both prisms after the robot has reached its drilling position and is stationary.

A faster but significantly less accurate method is based on a single reflector prism and a total station in addition to visible laser line parallel to a drill line. The user has to manually align the visible laser line.

The invention provides a determination of position and orientation of a mobile construction robot using an optical tracker and a single optical marker. The system achieves a resolution limited by the optical tracker.

A method of operating the mobile construction robot is based on: Placing an optical tracker on the architectural construction site. Parking a driving platform of the mobile construction robot in an area of the architectural construction site. Moving an end effector of the mobile construction robot in at least a first position and a second position by controlling a robotic arm mounted on the driving platform. Measuring the at least first position and second position relative to the driving platform using sensors mounted on the robotic arm. Tracking an optical marker mounted to end effector in the at least first position and second position of the end effector with the optical tracker. Measuring the at least first position and second position of the optical marker relative to the optical tracker with the optical tracker. And, determining position and orientation of the driving platform based on the at least first position and second position of the end effector measured relative to the driving platform and the at least first position and second position of the optical marker measured relative to the optical tracker.

An initial alignment of the optical tracker towards the optical marker may be needed only once. Afterwards, the optical tracker can follow the movement from the first position to the second position. Determining position and orientation of the driving platform can be performed faster than tracking two separate optical markers but without sacrificing on accuracy.

Certain preferred embodiments of the present invention will be described in greater detail by way of example only and with reference to the accompanying Figures.

DETAILED DESCRIPTION OF THE DRAWINGS

Figure 1:
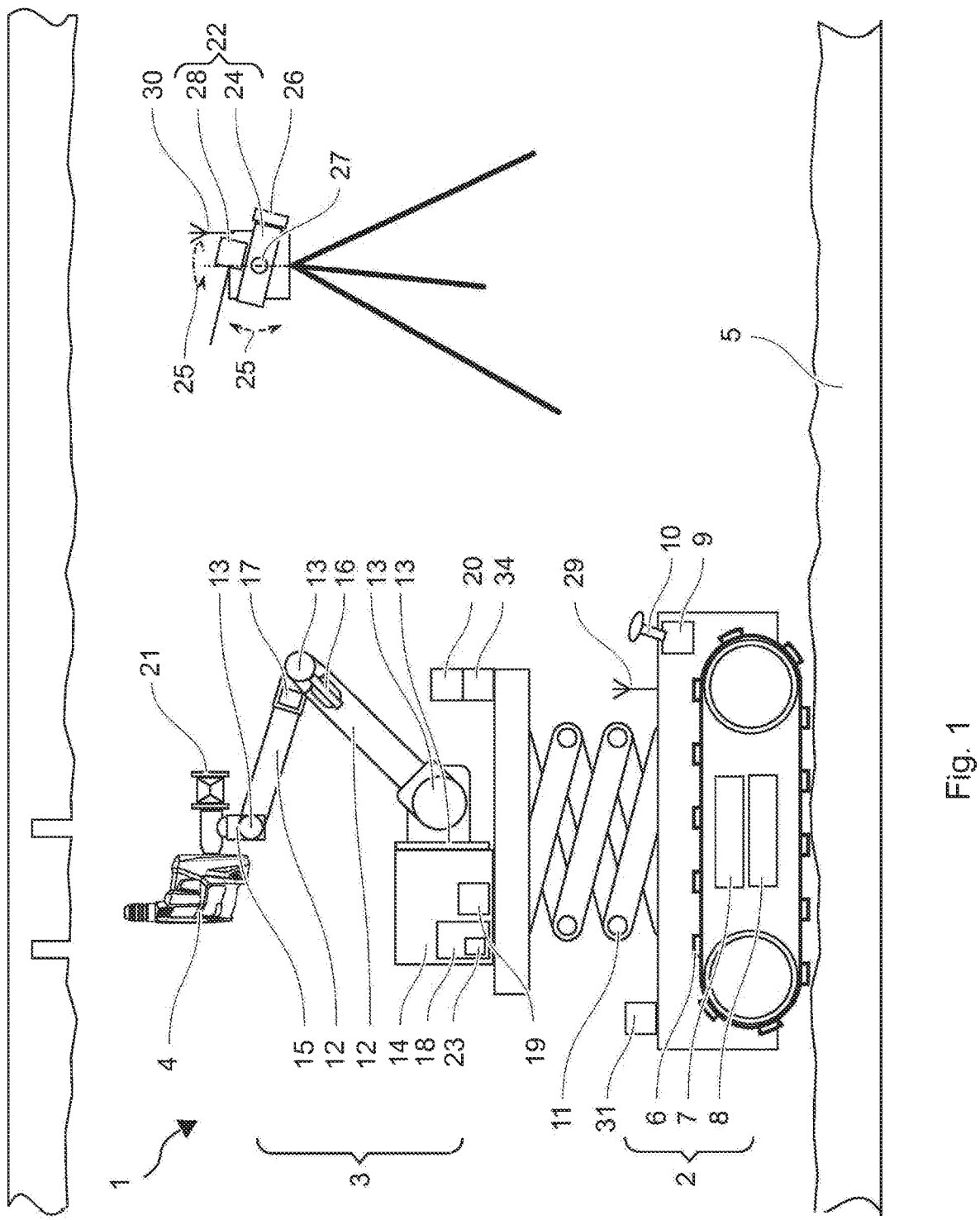
FIG. 1 illustrates a mobile construction robot.

One aspect of an embodiment of the present invention is shown generally in FIG. 1.

In this embodiment, there is provided a mobile construction robot 1 having a driving platform 2, a robotic arm 3 mounted to the driving platform 2 and an effector 3 mounted to the robotic arm 3, the effector 4 being adapted for machining or finishing an architectural construction site 5.

The driving platform 2 is illustrated by way of example. The driving platform 2 is adapted to stand stably and drive on the floor of an architectural construction site 5. The driving platform 2 may comprise a continuous track 6 or several wheels to stand on the floor. A motor 7, e.g., an electric motor, is coupled to the continuous track 6 or wheels. The motor 7 may be powered by battery pack 8 which is carried on the driving platform 2. A driving control unit (DCU) 9 controls the movement of the driving platform 2. The DCU 9 may comprise a user interface 10, e.g., a steering wheel, a joystick, an input screen, a keyboard, a tablet, a computer. The user interface 10 can be mounted to the driving platform 2 or be detachable from the driving platform 2. The user can instruct the driving platform 2 to move to a working position by indicating directions, like move straight, turn by a certain angle. Further, the user can instruct the driving platform 2 to semi-automatically or automatically drive to a working position by indicating coordinates of the position.

The illustrated mobile construction robot 1 comprises a vertical lift structure 11. The optional lift structure 11 is mounted on driving platform 2 and supports the robotic arm 3. The robotic arm 3 may be lifted vertically, i.e., against gravity, by the lift structure 11. The lift structure 11 can be a scissor-lift or a telescopic pillar.

FIG. 1 shows an embodiment of the robotic arm 3, in particular a six-axis, articulated robotic arm 3. The robotic arm 3 comprises several arm segments 12 and rotary joints 13. A first of the arm segments 12 forms a mount base 14 mounted to the driving platform 2, a last of the arm segments 15 carries the effector 4. The arm segments 12 are interconnected by the rotary joints 13. Thus, the arm segments 12 can pivot and/or rotate with respect to each other. Pivoting and rotating allows different postures of the robotic arm 3. The effector 4 can be maneuvered about a number of axis into an intended position and intended orientation.

The rotary joints 13 are equipped with a rotary drive 16. The rotary drive 16 is preferable integrated in the rotary joint 13 or one of the arm segment 12 connected to the rotary joint 13. The rotary drive 16 can rotate the one arm segment 12 connected to the rotary joint 13 with respect to the other arm segment 12 connected to the rotary joint 13. The rotary drive 16 can be an electric motor. A rotary sensor 17 measures the (joint) angle at the rotary joint 13 between the arm segments 12. The rotary sensor 17 may be integrated in the rotary drive 16, e.g., the rotary drive is a step motor 7. Further, the rotary sensor 17 can be a rotary encoder attached to or integrated in the rotary joint 13. A robotic control unit 18 controls all rotary joints 13 and its respective rotary drives 16 based on a kinematic model of the robotic arm 3. The kinematic model maps a position and orientation of the end effector 4 to corresponding joint angles for each of the rotary joints 13. The RCU 18 drives 16 the rotary joints 13 into the joint angles such the effector 4 is positioned and orientated as intended. A feedback-loop of the rotary sensors 17 and the RCU 18 while driving the rotary drives 16 may enhance accuracy and repeatability of the robotic arm 3. The RCU 18 can actively determine position and orientation of the effector 4 by inquiring the joint angles from the rotary sensors 17. Or the RCU 18 can store the actual position and orientation of the effector 4 in a memory bank 19 after each movement.

The robotic control unit 18 preferably references position and orientation of the end effector 4 to its mount base 14. The mount base 14 can be defined as origin in the coordinate system of the robotic control unit (RCU) 18. Precision and repeatability of position and orientation of the end effector 4 are mainly limited by the rotary sensors 17 and the rotary drives 16.

The robotic control unit 18 includes a calibration unit 20. The calibration unit 20 references the coordinate system of the RCU 18 to a coordinate system of the construction site 5. The calibration unit 20 includes an optical marker 21 attached to the end effector 4 and an optical tracker 22 stationary placed on the construction site 5. The calibration routine can be processed by a dedicated calibration processor 23.

The optical marker 21 is preferably a reflective prism.

The optical tracker 22 can be a theodolite, laser total station, tacheometer. A tacheometer has a telescope 24 mounted swingable about two different, typically orthogonal, axes 25. The optical tracker 22 automatically aligns the telescope 24 onto the optical marker 21. The telescope 24 projects an image of the optical marker 21 onto a photoelement with spatial resolution, e.g., a ccd-element. A processing unit of the telescope 24 swings the telescope 24 such that optical marker 21 or a beam reflected by the optical marker 21 falls onto centre point of the photoelement 26. The angles of telescope 24 about the two axes 25 are measured by high precision angular encoders 27, typically with a precision in the range of a milliradian. The tacheometer further includes an optical distance measuring device 28 which measures the distance to the optical marker 21 to which the telescope is oriented towards. The optical distance measuring device 28 typically emits a laser light beam and detects a reflection of the emitted laser light beam. The distance is determined based on a time of flight measurement of the reflection. The precision of the time of flight measurement can be enhanced with an interferometric setup and/or with modulations of the emitted light beam. The optical marker's 21 position with respect to the optical tracker 22 is determined by measuring the two angles and distance. A user installs the optical tracker 22 on the site 5. The instalment may include calibrating the optical tracker 22 with respect to some reference points of the construction site 5. Typically, the instalment is a labor-intensive action. Once installed, the optical tracker 22 can remain in position even though the robot 1 is driven to new locations as long the locations are in sight from by the optical tracker 22.

The calibration processor 23 has a communication interface 29 for communicating with the optical tracker 22 and a communication interface 30 for communicating with the robotic control unit 18. The communication interfaces 29, 30 can be implemented as wired connections or wire-less connections. Communication protocols can be based on established communication protocols like WiFi, Bluetooth, etc.

An embodiment of the calibration routine is explained with reference to FIG. 2.

The driving platform 2 is parked at a location on the construction site 5. The user may have manually steered the driving platform 2 to the location. The vertical lift structure 11 may be raised to a height, for instance manually by the user. For now, the vertical lift structure 11 remains at the height. Hence, the mount base 14 of the robotic arm 3 is immobile with respect to the construction site 5 and stays immobile throughout processing of the calibration routine. The coordinate system of the robotic arm 3 is immobile versus the coordinate system of the construction site 5.

The robotic arm 3 has been left in a posture by its last action. For instance, the posture may be a parking posture. The robotic arm 3 is moved into the parking posture while the driving platform 2 is moving. The robotic arm 3 and effector 4 are preferably protected against collisions with the environment. For instance, the robotic arm 3 does not laterally extend beyond the driving platform 2 and the effector 4 is lowered closest to the driving platform 2. Another action may be drilling of a ceiling. The end effector 4 is raised to the ceiling and orientated perpendicular to the ceiling.

The calibration routine may be initiated in response to a user input on the user interface 10. Alternatively or additionally, the calibration processor 23 may survey movements of the driving platform 2. The calibration processor 23 is triggered when the driving platform 2 stops. For instance, the DCU 9 provides a stop signal when the driving platform 2 changes from moving to standing. Further, the stop signal may be obtained by movement sensors 31 of any kind which are connected to the calibration processor 23.

The robotic arm 3 may stay in the posture used for the last action. The position and orientation of the end effector 4 is determined by the RCU 18. The position and orientation can be inquired by the calibration processor 23 from the RCU 18 by reading out the rotary sensors 17 of the robotic arm 3 or by reading out the memory bank 19 containing the position and orientation of the last movement. The actual posture may be used as first posture P1. The present position is the first position and orientation of the end effector 4 in reference to the driving platform 2.

Figure 3:
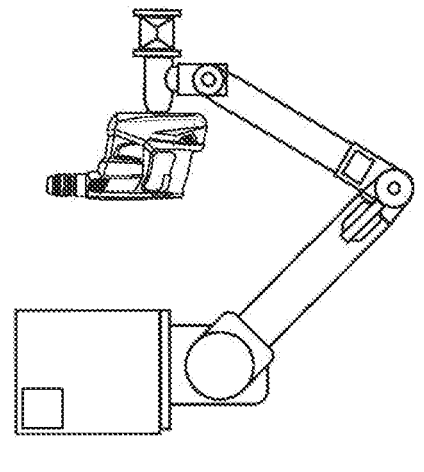
FIG. 3 illustrates the first position in a side view.

The robotic arm 3 may be moved into a predefined first posture P1 to have the end effector 4 in a first position and with a first orientation. FIG. 3 illustrates the first posture P1 by example. The end effector 4 is held such that the optical marker 21 is above any structure of the robotic arm 3. The optical marker 21 is in clear sight for the optical tracker 22, at least the optical marker 21 is not hidden behind the robotic arm 3. Another embodiment may have a set of dedicated postures. The robotic arm 3 moves into a posture which has most likely an unobstructed line of view to the optical tracker 22. The embodiment will be explained in a later paragraph. The first position and first orientation of the end effector 4 is inquired by the calibration processor 23 from the RCU 18.

The calibration processor 23 determines if the robotic arm 3 has reached the first posture P1. If so, the calibration processor 23 triggers the optical tracker 22 to measure the position a1 of the optical marker 21. The optical tracker 22 searches for the optical marker 21 by scanning the hemisphere defined by both its axes 25. In an embodiment, the calibration processor 23 can indicate a sector of the hemisphere where the optical marker 21 is to be found. The embodiment will be described in a later paragraph.

The optical tracker 22 submits the measured position a1 of the optical marker 21 to the calibration processor 23. The position a1 is referenced with respect to the optical tracker 22, which by itself is preferably referenced to the construction site 5. The position a1 may be expressed in spherical coordinates, e.g., two angles and a distance, in three-dimensional Cartesian coordinates. The submitted position a1 does not contain information about the orientation of the optical marker 21 with respect to the optical tracker 22 or any other reference system.

The calibration processor 23 references the submitted position a1 with the first posture P1. A shift vector indicating the vector form the origin of the optical tracker's coordinate system C2 to the origin of the robotic coordinate system C1 can be determined. The shift vector Vs can be the difference of the position vector a1 as measured by the optical tracker 22 and the position vector as measured by the RCU 18.

Figure 2:
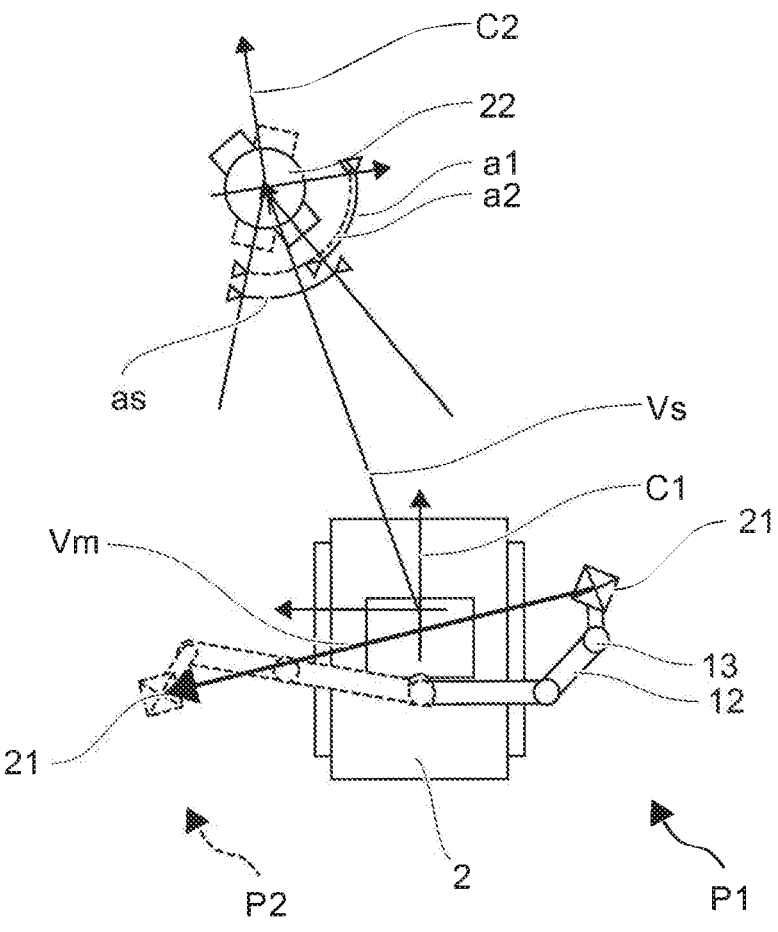
FIG. 2 is a schematic top view of the robot.

After the optical tracker 22 has submitted the position, the calibration processor 23 instructs the RCU 18 to move the robotic arm 3 into a second posture P2 (dotted lines in FIG. 2). The end effector 4 is shifted, at least partly, horizontally from the first posture P1 to the second posture P2. The movement vector Vm may have a horizontal component, only.

The calibration processor 23 instructs the optical tracker 22 to track the movement of the optical marker 21. Preferably, the optical tracker 22 is instructed to track before the robotic arm 3 starts moving. The movement of the optical marker 21 leads to a shift of its image in the optical tracker 22. The tracking mode of the optical tracker 22 realigns the telescope 24 based on a feedback-loop to compensate for the shift in the image of optical marker 21. The optical tracker 22 does not measure the position of the optical marker 21 while tracking. A higher tracking speed may be achieved which allows for a faster movement of the robotic arm 3.

Once the robotic arm 3 has reached the second posture P2, the second position and second orientation of the end effector 4 are inquired by the calibration processor 23 from the RCU 18. And, the calibration processor 23 instructs the optical tracker 22 to measure the position a2 of the optical marker 21 in the second posture P2. The optical tracker 22 submits the measured position a2 to the calibration processor 23. The calibration processor 23 evaluates a rotation of the robotic coordinate system C1 with respect to the optical tracker's coordinate system C2. The rotation can be determined based on the movement vector Vm as measured by the RCU 18, the movement vector Vm as measured by the optical tracker 22 and the shift vector Vs. The movement vector Vm is the difference of the position in the first posture P1 and the position in the second posture P2.

The second posture P2 may be a single predefined posture. However, preferably the calibration processor 23 determines the second posture P2 based on accuracy of a calibration result. The accuracy typically increases with a larger swing angle as of the optical tracker 22 in the horizontal plane from the first posture P1 to the second posture P2. The swing angle as is equivalent to the difference of the positions measured in the first posture P1 and second posture P2. The swing angle as depends on the length of the movement vector Vm and the orientation of the movement vector Vm relative to a line from the optical tracker 22 to the optical marker 21 or robot 1. The line corresponds with the shift vector Vs in the illustrated example. The length of the movement vector Vm is limited by the length of the robotic arm 3 and can further be constraint by the environment. The relative orientation of the movement vector Vm and the shift vector Vs has a high impact on the resolution. Preferably, the relative orientation is close to a perpendicular orientation.

A variation of the above embodiment increases the accuracy by adaptation of the second posture P2. The calibration routine determines angle between the movement vector Vs and the line of sight from the mount base 14 to the optical tracker 22. If the angle is smaller than a threshold the calibration routine determines a corrected second posture. The corrected second posture is determined such that the movement vector Vs from the first posture P1 to the corrected second posture is perpendicular or nearly perpendicular to the line of sight. The threshold is preferably an angle of at least 60 degrees.

The above description considered that the robot 1 is standing upright. The robot 1 may be standing on an inclined ground or the robot 1. The inclination may be determined by electronic inclinometers 34 mounted on the robot 1. Such inclinometers may be constructed as gyroscopes, microelectromechanical systems, etc. The inclination may be processed by the RCU 18 and taken into consideration for the above calibration.

The inclination may be confirmed by a measurement using the optical marker 21 and the optical tracker 22. The optical marker 21 is moved into a third position. There is geometric constraint on the third position otherwise a measurement using the third position will gain no new information. The angle as between the first position a1 and second position a2 is measured in a first plane, e.g., in a horizontal plane. The third position is displaced with respect to the plane, e.g., shifted vertically. Thus, an angle between the first position and the third position is measured in further plane non-parallel to the previous plane.

The optical marker 21 may be moved to further positions. The accuracy of the calibration may be increased by moving the optical marker 21 to several different positions and tracking the positions with optical tracker 22. In particular measurement noise may be suppressed.

Typically, a search of optical marker 21 by the optical tracker 22 requires a significant amount of time because the optical tracker 22 scans the full hemisphere around its location until the optical marker 21 is found. In an embodiment, the calibration routine seeks to limit the search to a sector of the hemisphere based on previous calibrations. The robot 1 is repeatedly relocated on the construction site 5 using the driving platform 2. The driving platform 2 registers the movement from the previous location to the present location. For instance, the driving platform 2 can register time, speed, distance, steer angle, turns, etc. by sensors mounted on the driving platform 2, like speedometer, tachometer, accelerometer. The calibration routine estimates a vector from the robot 1 to the optical tracker 22 based on the previous shift vector Vs and the movement registered by the driving platform 2. Further, the calibration routine may estimate a confidence range around the vector Vs in which the optical marker 21 is likely to be found. The confidence range may take into account the length of the vector Vs and/or the distance moved by driving platform 2. The calibration processor 23 transmits the vector Vs and confidence range to the optical tracker 22 such to search the optical marker 21 within the confidence range.

The optical tracker 22 may not be able to track the optical marker 21 while moving. A reason, in particular for reflective prisms, is that the optical marker 21 may turn away from the optical tracker 22 even though moved along a straight line. In a further embodiment, the RCU 18 estimates the direction towards the optical tracker 22 based on previous calibrations. The RCU 18 may reuse the calibration made at a previous location. Movement sensors on the driving platform 2 measure the movement from the previous location to the present location. The accuracy of the estimate may be only accurate to a few degrees. However, this is sufficient for avoiding a loss of tracking of the optical marker 21. While the optical marker 21 is in the first position a2 the end effector 4 is rotated such that the optical marker 21 points towards the optical tracker 22 based on the estimated direction Alike while the optical marker 21 is in the second position a2 the optical marker 21 is rotated such to point towards the optical tracker 22 based on the estimated direction.

What is claimed:

1. A smart drilling system comprising:
a controller configured to map a desired perforation to a site space at a perforation location;
a drilling machine comprising an optical marker and a drill for perforation, the drilling machine configured to perform perforation in the site space based on the perforation location under control of the controller based on the perforation location, wherein the optical marker is rigidly fixed to and is spaced apart from the drill; and
a tracker station configured to acquire a reference point location in the site space for mapping the desired perforation to the site space, and location information of the drill and the drilling machine in the site space through tracking the optical marker, wherein the tracker station is further configured to transmit the location information of the drill and the drilling machine to the controller, wherein the tracker station is fixedly positioned on a floor surface of a construction site,
wherein the drilling machine is moved into positions of multiple different work regions, and the tracker station sequentially acquires location information of the multiple different work regions of the drilling machine by tracking the optical marker and transmits the acquired location information to the controller, such that by using the transmitted location information of the multiple different work regions, the controller converts drilling machine coordinates into desired perforation coordinates and recognizes an orientation of the drilling machine,
wherein the controller recognizes a perforable point at a current position of the drilling machine through the location information of the drilling machine.

2. The smart drilling system of claim 1, wherein the drilling machine comprises:
a position adjustment device configured to three-dimensionally move the drill for perforation.

3. The smart drilling system of claim 2, wherein a relative position of the optical marker with respect to the drill is fixed, and a three-dimensional displacement and an angle of the drill are the same with a three-dimensional displacement and an angle of the optical marker when the position adjustment device is driven.

4. The smart drilling system of claim 3, wherein the drilling machine comprises a moving device configured to support the drilling machine on a floor surface of the actual space and to move the position adjustment device parallel to the floor surface of the actual space.

5. The smart drilling system of claim 4, wherein the drilling machine comprises an ascending/descending device disposed between the moving device and the position adjustment device and configured to adjust a height of an initial position of the drill.

6. The smart drilling system of claim 2, wherein the position adjustment device is a robot comprising at least one arm, and the drill and the optical marker are disposed at an arm of the at least one arm installed at an end of the robot.

7. The smart drilling system of claim 1, wherein the tracker station tracks the optical marker in real time and acquires the location information of the drilling machine.

8. The smart drilling system of claim 1, wherein the optical marker is spaced apart from the drill by a bracket.

9. The smart drilling system of claim 1, wherein the multiple different work regions consists of three work regions.

10. The smart drilling system of claim 1, wherein the optical marker is a prism.

11. A smart drilling machine for performing perforation through control by a controller, the smart drilling machine comprising:
a drill;
a position adjustment device configured to three-dimensionally move the drill for perforation;
an optical marker rigidly fixed to and spaced apart from the drill, the optical marker being configured to allow an external tracker station fixedly positioned on a floor surface of a construction site to acquire location information of the smart drilling machine and the drill through tracking the optical marker;
a moving device configured to support the drilling machine on the floor surface and to move the position adjustment device parallel to the floor surface; and
an ascending/descending device disposed between the moving device and the position adjustment device and configured to adjust a height of an initial position of the drill,
wherein the position adjustment device moves the optical marker into positions of multiple different work regions of the drilling machine in order to sequentially acquire location information of the multiple different work regions of the drilling machine through tracking the optical marker and transmit the acquired location information to the controller by the tracker station, such that by using the transmitted location information of the multiple different work regions, the controller converts drilling machine coordinates into design space coordinates and recognizes an orientation of the drilling machine and a perforable point of the drilling machine.

12. The smart drilling machine of claim 11, wherein the drill comes into contact with a ceiling surface and then performs perforation to a perforation depth based on a contact position with the ceiling surface.

13. A method of controlling a smart drilling system, the method comprising:
communicatively connecting a tracker station fixedly positioned on a floor surface of a construction site and a drilling machine;
mapping, via a controller, a desired perforation to a site space at a perforation location;
acquiring a reference point location in the site space;
acquiring location information of the drilling machine and a drill by tracking an optical marker rigidly fixed to and spaced apart from the drill;
transmitting the acquired location information of the drill and the drilling machine to the controller;
moving the drilling machine into positions of multiple different work regions of the drilling machine;

sequentially acquiring, by the tracker station, location information of the multiple different work regions of the drilling machine by tracking the optical marker;

transmitting, by the tracker station, the acquired location information to the controller;

converting drilling machine coordinates into desired perforation coordinates and recognizing an orientation of the drilling machine, using the transmitted location information of the multiple different work regions;

recognizing, by the controller, a perforable point at a current position of the drilling machine; and performing perforation at the perforable point via the drill of the drilling machine.

14. The method of claim 13, wherein, when perforation is terminated at the current position of the drilling machine, the tracker station tracks movement of the drilling machine in real time and transmits the location information of the drill and the drilling machine to the controller.

* * * * *